J. H. L. DE BATS.
METHOD OF UNITING HARD STEEL ALLOYS TO SOFTER STEEL BARS.
APPLICATION FILED AUG. 21, 1918.
1,434,047.                                                Patented Oct. 31, 1922.
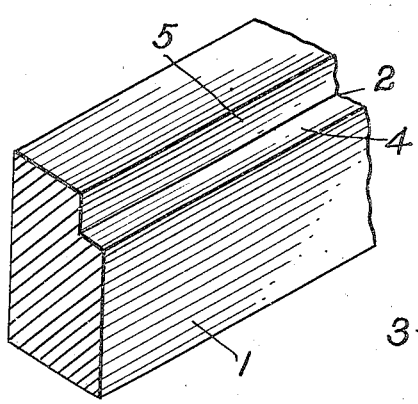
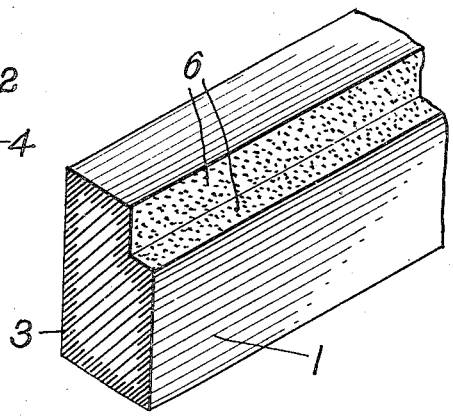
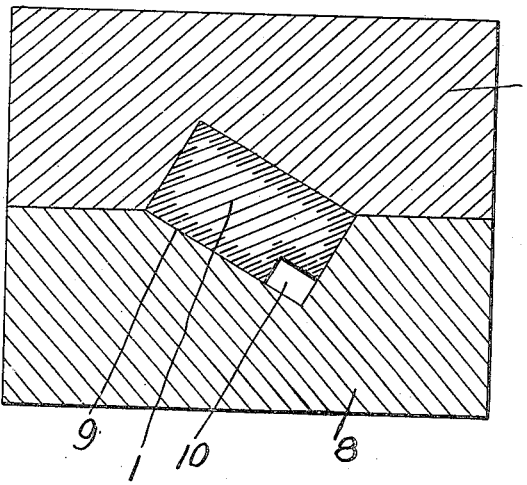
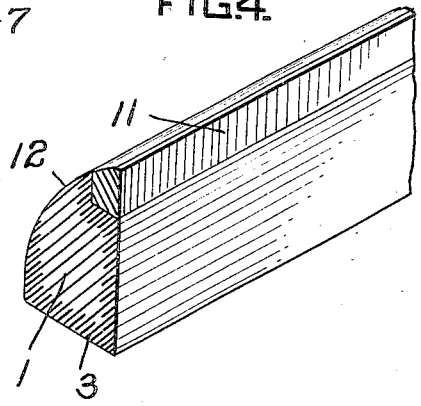

Patented Oct. 31, 1922.

1,434,047

UNITED STATES PATENT OFFICE.

JEAN HUBERT LOUIS DE BATS, OF ZELIENOPLE, PENNSYLVANIA, ASSIGNOR, BY MESNE ASSIGNMENTS, TO ANATMOS METALS AND FURNACE CORPORATION, OF NEW YORK, N. Y., A CORPORATION OF DELAWARE.

METHOD OF UNITING HARD STEEL ALLOYS TO SOFTER STEEL BARS.

Application filed August 21, 1918. Serial No. 250,852.

*To all whom it may concern:*

Be it known that I, JEAN HUBERT LOUIS DE BATS, resident of Zelienople, in the county of Butler and State of Pennsylvania, have invented a new and useful Improvement in Methods of Uniting Hard Steel Alloys to Softer Steel Bars, of which the following is a specification.

This invention relates to a metal product having a tough strong carbon steel body with a portion of much harder metal, such as high speed steel, firmly united thereto, and to the method of making the same.

The object of the invention is to produce such composite article having the tough strong steel body to which is firmly united a portion of much harder metal, such as high speed steel, and with the latter in the condition in which such metal is cast in chill molds.

The method will be described particularly for the manufacture of lathe and similar tools having a cutting portion of high speed steel, or the like, with a carbon steel body supporting it, but it obviously can be applied to the production of other articles and products.

By high speed steel is meant a steel which contains carbon and chromium, and either tungsten or molybdenum, and which is capable of travelling at a high speed through the metal being worked and does not lose its temper nor its toughness at a red heat. Such steel is most effective as a cutting tool when cast in a chill mold but in this condition is not strong enough to be used. It has been proposed to unite such high speed steel to a tougher steel, by welding by means of the acetylene torch or the electric arc, but this has the effect of destroying or reducing the high speed qualities and hardness.

According to my method a composite stock is produced having a tough steel body with a cutting portion of high speed steel or other alloy integrally united thereto and in a manner to preserve all of the inherent qualities of high speed steel when cast in a chill mold. In the accompanying drawing, Fig. 1 is a perspective view of the prepared steel bar forming the tough body of the stock; Fig. 2 is a similar view showing the same after case hardening and preparatory to uniting the high speed steel thereto; Fig. 3 is a sectional view of the mold used for applying the high speed steel to the tough body and Fig. 4 is a perspective view of the finished stock.

In the drawings, the method is shown as adapted particularly for forming a lathe tool. I first take a bar of tough steel 1 of the required dimensions and length, and cut along one edge thereof the rebate 2, which can be conveniently done by means of a milling tool. This bar is then preferably case hardened to form an exterior hard surface 3, although this is not absolutely necessary. I then coat the faces 4 and 5 of the rebate 2 with copper, preferably in powdered form, together with a suitable flux, as shown at 6, Fig. 2, and place the bar in any suitable heating furnace, which results in fusing the copper and causing it to form a closely adhering coating on the surfaces 4 and 5, and to amalgamate or alloy with the steel of the body 1. This bar is then inserted in a metal mold, preferably a split mold having the sections 7 and 8 formed of cast iron or steel and constituting a chill mold, and having cut therein a chamber 9 of the required dimensions to receive the bar 1, the rebate 2 leaving a space 10 between said bar and the surfaces of the chill mold. The high speed steel, or other alloy, in molten condition is then poured into this space, completely filling the same, and allowed to remain in the mold until thoroughly set, after which the molds are taken apart and the bar removed.

The molten high speed steel, or like alloy, poured into the space 10 welds or brazes onto the body 1 and forms a joint which is substantially as strong as an integral metal piece. The outer surface of this cast-in portion, being in contact with the chill mold, is chilled, in the well known manner, and consequently this portion of the stock, designated by the reference numeral 11 in Fig. 4, is in the condition when cast in a chill mold, and therefore is exceedingly hard and possesses the high speed qualities to the highest degree. The body can then have one edge cut away, such as by grinding, as indicated at 12, and the tool brought to the desired shape.

In the use of this stock the hard high speed edge 11 alone is brought into contact with the work and as it is exceedingly hard, and in the condition of cast chilled metal, the tool possesses the high speed qualities to the highest degree, and at the same time this very hard metal is carried and supported by the stronger and tougher steel body 1.

This method of producing the article permits of the use of an alloy for the hard cutting portion of the tool which is even harder and possesses the high speed qualities to a greater degree than ordinary high speed steel. Since this portion is supported by the tough steel body, its own strength is not depended upon, and consequently its carbon and chromium content can be increased over what is ordinarily found in high speed steel. In fact, it is possible to use an alloy which, strictly speaking, is not a steel at all, it being possible to use an alloy containing 40 per cent chromium, 40 per cent tungsten, 2.9 per cent carbon, and iron sufficient to complete the 100. Such allow is much harder, more durable, and possesses the high speed qualities to a much greater degree than the usual high speed steels and is so hard that it cannot even be ground. With such alloy it is desirable to draw its temper slightly by heating it to approximately 400 to 600° centigrade, which permits it to be formed to the desired shape by grinding.

My method obviously is adapted for forming in composite stock of high speed steel supported by a tough steel body, with the high speed steel either united in one corner of the body or extending entirely across one of the surfaces of the body, or, for that matter entirely enveloping the body.

I claim:

1. The method of uniting high speed steel to a tough steel body, consisting in coating a portion of the surface of the tough steel piece with a suitable brazing metal, placing said piece in a metal mold with a coated surface spaced from the mold wall, and then pouring molten high speed steel into said space and against the mold, whereby the tough steel body has united thereto a portion of high speed steel in its cast chilled condition.

2. A new article of manufacture comprising a tough steel body having firmly united thereto a portion of hard alloy metal high in carbon and chromium in the cast chilled condition.

3. A new article of manufacture comprising a tough steel body having firmly united thereto a portion of hard alloy metal high in carbon, chromium and tungsten in the cast chilled condition.

4. As a new article of manufacture, a tough steel body having firmly united thereto a portion of high speed steel in its cast chilled condition.

In testimony whereof, I have hereunto set my hand.

JEAN HUBERT LOUIS DE BATS.

Witness:
   G. G. GRILL.